Patented Nov. 7, 1939

2,179,204

UNITED STATES PATENT OFFICE 2,179,204

STROPHANTHUS GLUCOSIDE AND ITS MANUFACTURE

Arthur Stoll and Jany Renz, Basel, Switzerland, assignors to the firm Chemical Works formerly Sandoz, Basel, Switzerland No Drawing. Application May 11, 1937, Serial No. 142,053. In Switzerland April 21, 1937

6 Claims. (Cl. 260—210)

The seeds of *Strophanthus kombe* have been utilized for the manufacture of glucoside preparations for heart-therapy, which owing to their energetic and rapid efficacy on the heart have found an extensive use. These preparations have been introduced into the dispensatories under the name of $k$-strophanthine or amorphous strophanthine in contradistinction to the crystallized $g$-strophanthine from *Strophanthus gratus*. W. A. Jacobs and his collaborators at New York [see the publication of W. A. Jacobs, Physiological Reviews 13, 222 (1933)] have shown that $k$-strophanthine is a complicated mixture of glucosides poorer in sugar and glucosides richer in sugar and they succeeded in separating therefrom two crystallized fractions in pure state, viz: cymarine and $k$-strophanthine-$\beta$. Cymarine consists of aglucone strophanthidine and methylated desoxy sugar cymarose, whilst $k$-strophanthine-$\beta$ contains one molecule more of glucose which is bound to cymarose. It is possible, enzymatically, that is under the action of the strophanthobiase-enzyme discovered by Jacobs to split off the glucose from $k$-strophanthine-$\beta$ and to convert this glucoside into cymarine. The hydrolysis of $k$-strophanthine-$\beta$ by means of acid yields strophanthidine and strophanthobiose isolated by Jacobs, which consists of glucose and cymarose. Strophanthus glucosides richer in sugar than $k$-strophanthine-$\beta$ have, to date, never been obtained in pure state or crystallized.

Now, we have found that a new glucoside in pure crystallized form can be obtained from *Strophanthus-kombe*-seeds, which glucoside contains one molecule more of glucose than $k$-strophanthine-$\beta$. To this end we prepare, while avoiding enzymatic and other hydrolytic reactions, a glucoside mixture from *Strophanthus-kombe*-seeds, in which cymarine and $k$-strophanthine-$\beta$ are present in much smaller quantity than the new glucoside; the new glucoside constitutes in glucoside preparations produced in this way up to three quarters and more of the quantity of the now known three crystallized glucosides. The usual and manifoldly described fractioning methods do not allow crystallization and complete manufacture of the pure new glucoside, as even relatively small impurities appear to greatly prejudice the capacity of crystallization of the sugar-rich glucoside, which is very easily soluble in aqueous media.

We have further found that from the aforesaid preparations which contain the new glucoside in strongly enriched quantity, a compound can be obtained by thorough acetylation up to the heptacetyl degree, which is slightly soluble in the respective solvents and owing to its very great facility of crystallization is suitable for the complete separation of any by-products. If this heptacetate is subjected to a careful alkaline saponification, it is possible to split off the acetyl radicles without producing any modification in the structure of the glucoside molecule. The deacetylated product is obtained in such a pure form that it also crystallizes out and shows all the properties of a well defined compound. Its physiological efficacy attains and even surpasses that of the preparations from *Strophanthus kombe* hitherto used in therapy. As a pure preparation the new glucoside has the advantage of allowing exact dose administration and owing to the fact that it constitutes by far the main quantity of the pure glucosides obtained by the aforesaid careful isolation from *Strophanthus-kombe*-seeds, practically represents the entire efficacy of the natural drug.

The new glucoside crystallizes out from methylalcohol-chloroform or ethylalcohol-chloroform in form of white, dense bunches consisting of fine and ramified needles. In its vacuum-dried state, the substance avidly absorbs water. It is easily soluble in water and lower alcohols, almost insoluble in normal fat solvents such as chloroform, ether etc. In the color-reaction according to Liebermann, that is when a solution of the substance in acetic acid anhydride is carefully treated with concentrated sulphuric acid, the new glucoside shows a color change from red to green. The substance when dried in high vacuo melts at 199° C. (corr.) with decomposition. In an alcoholic solution the new glucoside turns the plane of polarized light slightly towards the right, $$[\alpha]_D^{20} = +12°(c=1.2)$$

From elementary analysis and the dissociation scheme the composition $C_{42}H_{64}O_{19}$ will be derived. On titration with normal caustic lye, one equivalent of NaOH is consumed. Hydrolysis with acids gives the theoretical yield of 46.3% of aglucone, which is identical to strophanthidine $C_{23}H_{32}O_6$, and a beautifully crystallized reducing trisaccharide $C_{19}H_{34}O_{14}$ which consists of 1 molecule of cymarose and 2 molecules of glucose.

Crude glcoside preparations may be enriched in their content of the new strophanthus glucoside in various ways:

I. The reduced seeds of *Strophanthus kombe* are for example thoroughly extracted with a mixture of chloroform-alcohol (proportion 5:2), the yellowish-green extract is carefully evaporated in vacuo at low temperature to dryness and the residue is treated with ether or petroleum ether until it becomes granular and filtrable. After a further intermediate treatment by boiling with ether, the residue in aqueous alcoholic solution is freed from tannic by-products by means of lead hydroxide and converted by addition of water and evaporation of the alcohol into a pure watery solution. By careful shaking out with chloroform, the cymarine which passes into the chloroform is removed. After addition of half a volume of alcohol to the watery solution the $k$-strophanthine-$\beta$ is largely removed by shaking out with chloroform. A subsequent evaporation of the solution in vacuo to dryness and the drying of the finely pulverized residue over phosphorus pentoxide gives a hygroscopic powder which is suitable for acetylation with acetic acid anhydride to the heptacetyl compound of the new glucoside.

II. Use may also be made, as initial material, of seeds from which fat has been extracted by means of petroleum ether, whereupon the glucoside mixture is extracted by means of 80% alcohol. The further treatment, particularly the isolation of the cymarine and the $k$-strophanthine-$\beta$ may be effected as described in the preceding paragraph I.

III. The cymarine and $k$-strophanthine-$\beta$ may also be separated from the raw glucoside mixture by evaporating the aqueous alcoholic solution after the lead treatment in vacuo at low temperature to dryness, dissolving the residue in absolute alcohol and precipitating by means of a double volume of ether, while strongly stirring, the sugar-richer part of the glucoside. The cymarine and $k$-strophtanthine-$\beta$ remain in solution. In some cases this operation of precipitation may be repeated. With the last precipitation the peracetylation is then performed.

IV. By working up the starting drug under conditions in which hydrolytic dissociations of the glucosides are avoided, it will be possible, owing to the great crystallizability of the heptacetate of the new glucoside, to satisfactorily perform the peracetylation on the total glucoside preparation freed from tannic substances and to thus obtain a beatifully crystallized product of acetylation. As the heptacetyl derivative of the new glucoside is the most difficulty soluble and is present in preponderating quantity, its purification can be performed by several recrystallizations. By saponifying the acetyl groups the crystallized new glucoside is directly obtained.

V. One may also obtain the new strophanthus glucoside when using good strophanthus seeds without the removal of the tannic substances, the cymarine and the $k$-strophanthine-$\beta$, if the ether-insoluble glucoside mixture extracted according to the methods above given under I or II, and boiled with ether up to constant weight, is dissolved in pyridine and acetylated as above described under I and thereupon further worked up.

The following examples illustrate the invention:

*Example 1*

1 kg. of *Strophanthus-kombe*-seeds is milled with 1 kg. of ammonium sulphate and extracted with 7 liters of a chloroform-alcohol-mixture (proportion 5:2), while stirring, for three quarters of an hour. The separated seed residue is further washed out with 5 liters of chloroform-alcohol (5:2), again finely milled and treated a second time in a corresponding manner. The combined yellowish-green extracts are evaporated at low temperature (below 40° C.) as fully as possible to dryness. The remaining green, still viscous, fatty residue is thoroughly treated with 3 liters of petroleum ether. After about 20 hours it has become granular and filtrable and is then boiled with ether up to constant weight. The ether-insoluble part is dissolved in a hundred-fold the quantity of alcohol and mixed while stirring with the same volume of a suspension of freshly prepared and neutral washed lead hydroxide in distilled water (containing 5 g./ liter). After a short time the mixture is filtered through talc and the residue is further washed with alcohol-water (1:1).

The combined filtrates, which contain the mixture of the raw glucosides, are then concentrated in vacuo at low temperature until the alcohol is completely removed.

The solution is then completed up to 1 liter and shaken five times with 200 ccm. of chloroform each time, to remove the cymarine as well as the yellowish greasy impurities. From the residue of the evaporated chloroform solution the pure cymarine can be obtained by recrystallization from methylalcohol.

The clarified yellowish aqueous solution, which is 1 liter in volume, is then mixed with 500 ccm. of alcohol and 1 liter of chloroform. The chloroform-layer contains the $k$-strophanthine-$\beta$ and is separated. The watery alcoholic part is concentrated in vacuo until the alcohol is removed. After completion with water to 1 liter, the same shaking up with chloroform is repeated. From the distillation residue of the two chloroform-extracts, upon admixture with some water, the $k$-strophanthine-$\beta$ immediately crystallizes out; it can be obtained in pure form by recrystallization from alcohol-water or hot water.

The watery part or layer, which has been freed by the two shaking operations from the preponderating part of the $k$-strophanthine-$\beta$, is now concentrated in vacuo below 40° C. to complete dryness. The residue is dissolved in absolute alcohol and the solution is clarified by filtration. The yellow colored filtrate is again concentrated in vacuo, the residue finely pulverized and dried over phosphorus pentoxide. Thus, 40-50 g. of a dry hygroscopic powder are obtained, which contains the new glucoside.

For the purpose of peracetylation, the said powder is dissolved in 5 parts of anhydrous pyridine and the solution is intermixed by successive portions with 1.5 parts of acetic acid anhydride. After 6 to 12 hours the dark colored solution is poured into a large quantity of ice-water. The resulting greasy precipitate is thoroughly kneaded with fresh ice-water until it becomes solid and filtrable. To remove the pyridine as completely as possible, the clear residue is triturated in a mortar with some water, again filtered and subsequently washed with water. The crude acetyl compound whose weight is approximately equal to that of the glucoside quantity employed, is then strongly dried. The dried crude acetate is dissolved in about 15 to 20 times the quantity of absolute alcohol on the steam-bath, boiled up with 5% of its weight of animal charcoal and clarified through a folded filter. The clear, still yellow solution is allowed to stand for about 4 days at room temperature for the purpose of crystallization. The crystallized product consists in part of needles, but mainly of papillary structures and is again recrystallized from a hundred-fold the quantity of absolute alcohol. Generally this second crystallized product consists exclusively of needles; if papillary structures are still present, the recrystallization must be repeated. From the mother-liquor there can be obtained after concentration still a second pure fraction. Total yield: 20–25 g. of pure heptacetyl compound.

The obtained heptacetyl compound crystallizes from hot absolute ethylalcohol, methylalcohol or acetone-water in form of colorless, non-hygroscopic needles. It is almost insoluble in water, difficultly soluble in cold ethylalcohol and methylalcohol, but easily soluble in acetone, benzene and chloroform. The substance melts at 229–230° (corr.) under decomposition and, in a 1% benzene solution, turns the plane of polarized light slightly towards the left, $$[\alpha]_D^{20°} = -4.5°$$

Elementary analysis gives the composition $C_{56}H_{78}O_{26}$ and acid hydrolysis yields the theoretical amount of 34.6% of aglucone, which is identical to strophanthidine $C_{23}H_{32}O_6$. The Liebermann's color reaction yields a color change from red to green.

For the purpose of saponification 20 g. of the strongly dried heptacetyl compound are dissolved in 3.5 liters of hot absolute methanol and the clear solution is allowed to cool down to 15° C. The same is then mixed, while shaking, with 15.00 ccm. of a bariummethylate solution (corresponding to 35–40 ccm. of 0.1 n-sulphuric acid) and left for about 12 hours within the ice-chest. The ice-cold solution, which has still an alkaline reaction towards phenolphthalein, is mixed with exactly the quantity equivalent to barium of 0.1 n-sulphuric acid, filtered clear after some standing and thereupon evaporated in vacuo at a bath temperature of 30° C. to complete dryness.

The residue is dissolved in 200 ccm. of absolute alcohol. If the solution should be yellowish, it is boiled up with 0.5 g. of animal charcoal and filtered clear through a little talc. It is then gradually intermixed in a large Erlenmeyer-flask while continuously shaking with 1800 ccm. of dry chloroform, the solution remaining entirely clear. Any turbidity therein can be removed by addition of some drops of absolute alcohol. The mixture is allowed to stand quietly for 8–10 days. The crystallization of the new pure glucoside begins slowly, at the beginning with precipitation of papillary structures which under the microscope appear in the form of dense bunches of needles. Only after some time longer needles grow out from the bunches. The yield on careful working is practically equal to theory.

Example 2

1 kg. of *Strophantus kombe* seeds are finely milled and stirred with 3 liters of petroleum ether for 6 hours. The yellow-green colored petroleum ether extract is separated, the residue further washed and again allowed to stand for about 12 hours with 2–3 liters of petroleum ether. The residue, subjected to suction and dried, is then extracted with 6 liters of 80% alcohol for 5 hours while continuously stirring, again subjected to a suction operation, subsequently washed and again extracted with 6 liters of 80% alcohol. The collected alcohol extracts are then completely concentrated in vacuo at 40° C., whereupon the residue is boiled with ether up to constant weight.

The ether-insoluble part is dissolved in a hundred-fold the quantity of alcohol as described in Example 1 and then treated with the same volume of a supension of lead hydroxide in water. The solution of the mixture of the crude glucosides obtained by filtration through talc is then worked up as described in Example 1.

Example 3

The solution of the mixture of the crude glucosides obtained after treatment with lead hydroxide according to Example 1 or 2 is concentrated in vacuo at low temperature to complete dryness. The yellow-brown residue is absorbed in 1–2 liters of absolute alcohol and the solution is freed by filtration from inorganic residues. This alcoholic solution is mixed with twice the volume of dry ether while strongly stirring, whereupon the separated precipitate is subjected to a suction operation and again reprecipitated from alcohol with ether. After this second reprecipitation the preparation contains the new glucoside besides traces of $k$-strophanthine-$\beta$; it is dissolved in 5 parts of anhydrous pyridine and worked up to the new pure glucoside in a similar manner to that described in Example 1.

Example 4

The absolute alcoholic solution of the total glucoside preparation, clarified according to Example 3 from inorganic residues is concentrated in vacuo at low temperature to dryness. The residue is pulverized and dried in the desiccator. Without fractionation the glucoside mixture is dissolved in five-fold the quantity of pyridine and worked up according to Example 1 to the crude heptacetyl compound, which is recrystallized from 15 to 20 times the quantity of absolute alcohol. To completely purify the acetylation product of the new glucoside, the most difficultly soluble among the present acetylation products, several recrystallizations are necessary, which are performed as described in Example 1. The yield is, therefore, somewhat smaller than the latter, but the procedure is shorter. The transformation into the new crystallized acetyl-free glucoside takes place according to Example 1.

Example 5

The ether-insoluble part obtained according to Example 1 or 2 from good strophanthus seeds by boiling with ether and which still contains the tannic substances, is dissolved in pyridine and acetylated and worked up as in Example 1.

The new glucoside which consists of strophanthidine, cymarose and 2 molecules of glucose has received the scientific denomination "$k$-strophanthoside."

What we claim is:

1. A process for the preparation of $k$-strophanthoside, comprising the steps of making an extract rich in glucoside by treating the seeds of *Strophanthus kombe* with an organic solvent selected from the class consisting of ethanol and its mixtures with chloroform, evaporating the solution thus obtained and treating the residue with an acetylating agent in order to transform the new glucoside into its heptaacetyl compound, separating the heptaacetyl compound from the by-products by fractional crystallization, saponifying the same by treating it with a non-aqueous solution of an alcoholate and crystallizing the glucoside.

2. A process for the preparation of $k$-strophanthoside, comprising the steps of making an extract rich in glucoside by treating the seeds of *Strophanthus kombe* with an organic solvent selected from the class consisting of ethanol and its mixtures with chloroform, evaporating the solution thus obtained and treating the residue with acetic acid anhydride in order to transform the new glucoside into its heptaacetyl compound, separating the heptaacetyl compound from the by-products by fractional crystallization, saponifying the same by treating it with a non-aqueous solution of an alcoholate and crystallizing the glucoside.

3. A process for the preparation of k-strophanthoside, comprising the steps of making an extract rich in glucoside by treating the seeds of *Strophanthus kombe* with an organic solvent selected from the class consisting of ethanol and its mixtures with chloroform, evaporating the solution thus obtained and treating the residue with acetic acid anhydride in presence of pyridine, in order to transform the new glucoside into its heptaacetyl compound, separating the heptaacetyl compound from the by-products by fractional crystallization, saponifying the same by treating it with a non-aqueous solution of an alcoholate and crystallizing the glucoside.

4. A process for the preparation of k-strophanthoside, comprising the steps of making an extract rich in glucoside by treating the seeds of *Strophanthus kombe* with an organic solvent selected from the class consisting of ethanol and its mixtures with chloroform, evaporating the solution thus obtained and treating the residue with acetic acid anhydride in order to transform the new glucoside into its heptaacetyl compound, separating the heptaacetyl compound from the by-products by fractional crystallization, saponifying the same by treating it with barium methylate in methanol solution and crystallizing the glucoside.

5. The new crystallized glucoside from *Strophanthus kombe*, called k-strophanthoside, of the composition $C_{42}H_{64}O_{19}$, which yields by hydrolysis 46.3% of aglucone, which is identical to strophanthidine $C_{23}H_{32}O_6$ and a trisaccharide $C_{19}H_{34}O_{14}$, which consists of 1 molecule of cymarose and 2 molecules of glucose, which crystalizes in form of white dense bunches consisting of fine needles easily soluble in water and lower alcohols, almost insoluble in chloroform, ether, etc., which possesses in an 1.2% alcoholic solution a rotation power of $$[\alpha]_D^{20°} = +12°$$

and which melts when dried in high vacuo at 199° C. (corr.) under decomposition and which yields by the Liebermann's color reaction a color change from red to green.

6. The new heptacetyl derivative of k-strophanthoside of the composition $C_{56}H_{78}O_{26}$, which yields by acid hydrolysis 34.6% of aglucone which is identical to strophanthidine, which crystallizes in form of colorless, non-hygroscopic needles melting at 229–230° (corr.) under decomposition, possessing in a 1% benzene solution a rotation power of $$[\alpha]_D^{20} = -4.5°$$

the compound being easily soluble in acetone, benzene and chloroform, difficultly soluble in ethylalcohol and methylalcohol and very difficultly soluble in water and yielding by the Liebermann's color reaction a color change from red to green.

ARTHUR STOLL.
JANY RENZ.